United States Patent Office 3,526,618
Patented Sept. 1, 1970

3,526,618
SYMMETRICAL AND ASYMMETRICAL DISAZO DYESTUFFS
Walter Horstmann, Cologne-Buchheim, and Edgar Siegel, Leverkusen-Steinbuechel, Germany, assignors to Farbenfabriken Bayer Aktiengesellschaft, Leverkusen, Germany, a corporation of Germany
No Drawing. Filed May 15, 1967, Ser. No. 638,649
Claims priority, application Germany, May 23, 1966,
F 49,253
Int. Cl. C09b *43/00*
U.S. Cl. 260—152                                8 Claims

ABSTRACT OF THE DISCLOSURE

Azo dyestuffs which are free of sulphonic acid have the formula:

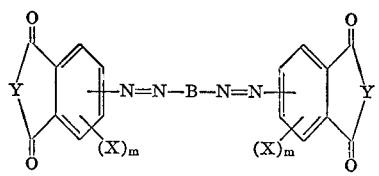

wherein B is a divalent arylene amide, Y is oxygen or >N—R, X represents a ring substituent, and $m$ is 0–3. Such dyestuffs are characterized by good fastness to solvents, light and migration, and by good thermal stability, and are useful for dyeing synthetic materials and for the production of printing colors and pigment pastes.

---

The object of the present invention comprises valuable new azo dyestuffs which are free from sulphonic acid groups and correspond to the general formula

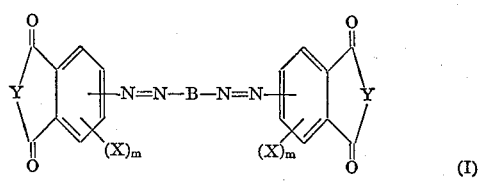

in which the radicals X denote identical or different substituents, $m$ denotes integers from 0 to 3, B is a bivalent organic radical and Y is oxygen or >N—R, wherein R denotes hydrogen, a hydroxyl or acyl radical or a radical —OR$_1$, or —NR$_2$R$_3$, or an optionally substituted alkyl, aralkyl, carbocyclic or heterocyclic mono- or poly-nuclear radical, and wherein R$_1$, R$_2$ and R$_3$ are hydrogen or optionally substituted alkyl or aryl substituents.

Suitable substituents X are, for example: lower alkyl substituents, such as methyl and ethyl; chloro and nitro substituents; lower alkoxy substituents, such as methoxy and ethoxy; fluoro, bromo, methylsulphonyl, phenylsulphonyl, trifluoromethyl substituents; and carbalkoxy substituents, such as carbomethoxy and carbethoxy.

Suitable bivalent organic radicals B are, for example: N,N'-arylene-bis-[2' - hydroxy - naphthoyl - (3')]-amides, N,N'-arylene-bis-acetoacetyl-amides, arylene-bis-[3-methylpyrazolone - (5) - yl - (1)] or arylene-bis-[3-methyl-5-amino-pyrazolyl-(1)] of the formula

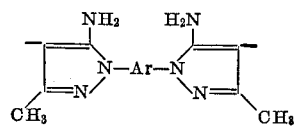

The following radicals may be mentioned for R, for example: hydrogen; methyl, ethyl, phenyl radicals; substituted phenyl radicals, such as 2- or 3- or 4-chloro-, 2- or 3- or 4-methyl-, 2- or 3- or 4-methoxy-phenyl radicals; cyclohexyl, naphthyl-(1) or -(2), pyridyl-(2) or benzothiazolyl radicals.

The new disazo pigments of the Formula I are obtained by converting disazo dyestuffs of the formula

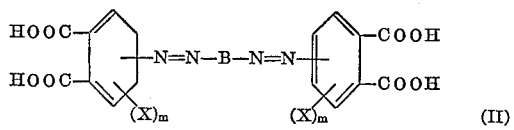

in which B, X and $m$ have the same meaning as above, with dehydrating agents into the dianhydrides, or by condensing the tetracarboxylic acids of the Formula II or their di-anhydrides with at least 2 moles of a compound of the formula $$H_2N—R$$

in which R has the same meaning as above, to form the di-imide compound, selecting starting components which are free from sulphonic acid groups. In this way there are obtained pigment dyestuffs which are sparingly soluble in organic solvents.

The starting dyestuffs of the Formula II can be obtained by coupling 1 mole of a bifunctional coupling component H—B—H with 2 moles of diazotised, identical or different, optionally substituted amino-phthalic acid, choosing starting components which are free from sulphonic acid groups. The coupling of, initially, one mole of diazotised, optionally substituted amino-phthalic acid with one of the bivalent organic radicals mentioned above leads to a monoazo dyestuff which is readily soluble in an alkaline medium, due to the two carboxyl groups, so that the reaction with another mole of optionally substituted aminophthalic acid can easily be performed. Some of the resultant disazo-tetracarboxylic acid dyestuffs are readily soluble in the reaction medium, others are more sparingly soluble.

The following diazo components can be used for synthesising the disazo dyestuffs (II), for example: 3-amino-phthalic acid, 3-amino-4-methyl-phthalic acid, 3-amino-6-methyl-phthalic acid, 3-amino-5-nitro-phthalic acid, 4-amino-6-nitro-phthalic acid, 3-amino-4-methoxy-phthalic acid, 3-amino-6-methoxy-phthalic acid, 3-amino-4-chloro-phthalic acid, 3-amino-6-chloro-phthalic acid, 3-amino-5,6-dimethoxy-phthalic acid, 3-amino-6-fluoro-phthalic acid, 3-amino-6-bromo-phthalic acid, 3 - amino - 6 - phenylsulphonyl-phthalic acid, 4-amino-phthalic acid, 4-amino-3-chloro-phthalic acid, 4-amino-5-chloro-phthalic acid, 4-amino-3-methyl-phthalic acid, 4-amino-5-methyl-phthalic acid, 4-amino-3-methoxy-phthalic acid, 4 - amino -5 - methoxy-phthalic acid, 4-amino-5,6-dichloro-phthalic acid, 4-amino-3,6-dichloro-phthalic acid, 4-amino - 5 - methylsulphonyl-phthalic acid, 4-amino-5-phenylsulphonyl-phthalic acid.

Examples of suitable coupling components H–B–H are the following:

N,N'-bis-[3'-hydroxy-naphthoyl-(2')]-phenylene-diamine-1,4,
N,N'-bis-[3'-hydroxy-naphthoyl-(2')]-2-chloro-phenylene-diamine-1,4,
N,N'-bis-[3'-hydroxy-naphthoyl-(2')]-2-methyl-phenylene-diamine-1,4,
N,N'-bis-[3'-hydroxy-naphthoyl-(2')]-4'',4'''-diamino-diphenyl,
N,N'-bis-[3'-hydroxy-naphthoyl-(2')]2'',2'''-dichloro-4'',4'''-diamino-diphenyl,
N,N'-bis-[3'-hydroxy-naphthoyl-(2')]-3'',3'''-dichloro-4'',4'''-diamino-diphenyl,
N,N'-bis-[3'-hydroxy-naphthoyl-(2')]-3'',3'''-dimethoxy-4'',4'''-diamino-diphenyl,
N,N'-bis-[3'-hydroxy-naphthoyl-(2')]-3'',3'''-dimethyl-4'',4'''-diamino-diphenyl,
N,N'-bis-[3'-hydroxy-naphthoyl-(2')]-4'',4'''-diamino-diphenyl-methane,
N,N'-bis-[3'-hydroxy-naphthoyl-(2')]-4'',4'''-diamino-diphenyl ether,
N,N'-bis-[3'-hydroxy-naphthoyl-(2')]-4'',4'''-diamino-diphenyl-sulphone,
N,N'-bis-[3'-hydroxy-naphthoyl-(2')]-4'',4'''-diamino-benzophenone,
N,N'-bis-[3'-hydroxy-naphthoyl-(2')]-phenylene-diamine-1,3,
N,N'-bis-[3'-hydroxy-naphthoyl-(2')]-2-methyl-phenylene-diamine-1,3,
N,N'-bis-[3'-hydroxy-naphthoyl-(2')]-2,5-dimethyl-phenylene-diamine-1,4,
N,N'-bis-[3'-hydroxy-naphthoyl-(2')]-4'',4'''-diamino-stilbene,
N,N'-bis-[3'-hydroxy-naphthoyl-(2')]-4'',4'''-diamino-diphenyl-urea,
N,N'-bis-[3'-hydroxy-naphthoyl-(2')]-2,7-diamino-naphthalene,
N,N'-bis-[3'-hydroxy-naphthoyl-(2')]-2,7-diamino-diphenylene-oxide,
N,N'-bis-(acetoacetyl)-phenylene-diamine-1,4,
N,N'-bis-(acetoacetyl)-2,5-dichloro-phenylene-diamine-1,4,
N,N'-bis-(acetoacetyl)-2,5-dimethyl-phenylene-diamine-1,4,
N,N'-bis-(acetoacetyl)-2-chloro-phenylene-diamine-1,4,
N,N'-bis-(acetoacetyl)-2-methyl-phenylene-diamine-1,4,
N,N'-bis-(acetoacetyl)-biphenylene-4,4'-diamine,
N,N'-bis-(acetoacetyl)-2,2'-dichloro-biphenylene-4,4'-diamine,
N,N'-bis-(acetoacetyl)-3,3'-dichloro-biphenylene-4,4'-diamine,
N,N'-bis-(acetoacetyl)-3,3'-dimethyl-biphenylene-4,4'-diamine,
N,N'-bis-(acetoacetyl)-4,4'-diamino-diphenyl-methane,
N,N'-bis-(acetoacetyl)-4,4'-diamino-diphenyl-sulphone,
N,N'-bis-(acetoacetyl)-4,4'-diamino-diphenyl ether,
N,N'-bis-(2'-hydroxy-benzoyl-)-4''',4''''-diamino-diphenyl,
N,N'-bis-(2'-hydroxy-benzoyl-)-phenylene-diamine-1,4,
Phenylene-(1,4)-bis-[3'-methyl-pyrazolon-(5')-yl-(1')],
Phenylene-(1,4)-bis-[3'-carbomethoxy-pyrazolon-(5')-yl-(1')],
Phenylene-(1,4)-bis-[3'-methyl-5'-amino-pyrazol-yl-(1')],
Biphenylene-(4,4')-bis-[3''-methyl-5''-amino-pyrazol-yl-(1'')],
Biphenylene-(4,4')-bis-[3''-methyl-pyrazolon-(5'')-yl-(1'')],
Biphenylene-(4,4')-bis-[3''-carbomethoxy-5''-amino-pyrazol-yl-(1'')],
[3,3'-dimethyl-biphenylene-(4,4')]-bis-[3''-methyl-pyrazolon-(5'')-yl-(1'')],
[3,3'-dimethyl-biphenylene-(4,4')]-bis-[3''-methyl-5''-amino-pyrazol-yl-(1'')].

The disazo-tetracarboxylic acids (II) which are comparatively readily soluble in water are converted according to the invention by treatment with dehydrating agents, for example, by heating with acetic acid, acetic anhydride, sodium acetate or iron (III) chloride, by themselves or in a high-boiling organic solvent, into the corresponding disazo-tetra-carboxylic dianhydride (I) (Y=O), which are sparingly soluble in water and in organic solvents.

Condensation of the starting components (II) or their di-anhydrides with ammonia or amines (III) is preferably carried out in a high-boiling organic solvent and in the presence of dehydrating agents; the components may also serve themselves as organic solvents. For example, the condensation is carried out at an elevated temperature, generally in the range from 80° C. to 240° C., preferably between 100° C. and 180° C., and, if desired, under pressure. Monoamines suitable for this reaction are, for example: methylamine, ethylamine, aniline, 2- or 3- or 4-chloro-aniline, 2- or 3- or 4-methyl-aniline, 2- or 3- or 4-methoxy-aniline, 2- or 4-nitroaniline, 4-amino-benzamide, N-acetyl-phenylene-diamine-1,4, N-benzoyl-phenylene-diamine - 1,3 - cyclohexylamine, 2-aminobenzothiazole, 2-amino-pyridine, 1- and 2-amino-naphthalene and 3-amino-4-chloro-benzamide.

The following solvents boiling above 80° C. are suitable, for example, for the condensation of the disazo dyestuffs (II) or their di-anhydrides with the compounds (III) in high-boiling organic solvents: benzene, toluene, xylenes, chlorobenzene, o-, m-, p-dichlorobenzene, trichlorobenzenes, quinoline, nitrobenzene, glacial acetic acids, cyclohexane, 1,2,3,4-tetrahydronaphthalene, naphthalene, tetrachloroethylene, anisole, diphenyl ether, di-n-butyl ether, decalin, and mixtures of solvents of this type. Dehydrating agents which are preferably used are, for example: formic acid, acetic acid, propionic acid, anhydrous sodium acetate, zinc chloride, iron chloride, aluminum chloride and boron trifluoride.

For the reaction of the disazo-tetracarboxylic acids (II) or their di-anhydrides with the compounds (III) there are used at least 2 moles of the compounds (III); in general, the operation is carried out with an excess of up to 5 moles of the component (III) per mole of the component (II), in order to achieve a complete conversion of the components (II).

Symmetrical or asymmetrical disazo dyestuffs of the Formula I can be synthesised, depending upon the choice of the components (III).

The products which can be obtained according to the present process are valuable pigment dyestuffs which are generally characterised by good fastness to solvents, light and migration and by a good thermal stability. They are used for colouring synthetic materials, such as plasticisercontaining polyvinyl chloride, polyethylene and acrylonitrile-butadiene-styrene copolymers and graft polymers, lacquers, papers, and for the production of printing colours and pigment pastes.

In the following examples the parts are parts by weight; the temperatures are degrees centigrade.

EXAMPLE 1

44.5 parts 3-amino-phthalic acid are suspended in 500 parts of water, 200 parts of ice and 81 parts of concentrated hydrochloric acid are added and the mixture is diazotised at 0–5° with a solution of 17.2 parts sodium nitrite in 50 parts of water.

34 parts N,N'-bis-(acetoacetyl)-phenylene-diamine-1,4 are suspended in 150 parts ethanol, a solution of 80 parts sodium carbonate in 2000 parts of water is added and the above diazo suspension is introduced at 10°. When the coupling is completed, the dyestuff is filtered off with suction, washed with a little ice-water and dried at 60° until the weight is constant.

The dried and powdered dyestuff is heated in 500 parts 410 parts of a 10% sodium hydroxide solution and 1000 parts of ice are added and the above diazo suspension is introduced at 5–10° in the presence of an emulsifier. The mixture is stirred at room temperature for a further 2 hours, then adjusted to pH 1–2 by means of semi-concentrated hydrochloric acid, the dyestuff is filtered off with suction, washed with water until neutral and dried at 80° until the weight is constant. The yield is 91 parts.

The dyestuff is converted into the di-anhydride by heating it with 500 parts chlorobenzene and 50 parts acetic anhydride at about 120° for 3 hours. 84 parts of the di-anhydride are obtained.

8.0 parts of the di-anhydride are suspended in 500 parts o-dichlorobenzene, 5 parts aniline are added and the mixture is heated at 120° for 4 hours. 50 parts acetic acid subsequently added and the mixture is kept at 120–130° for a further 6–8 hours. The pigment dyestuff is filtered off with suction at 80°, washed with warm o-dichlorobenzene until the runnings are clear and then dried until the weight is constant. The yield is 8.5 parts of a pigment dyestuff of the formula

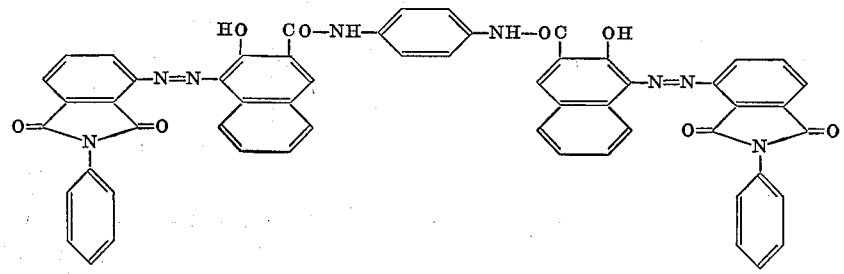

chlorobenzene with 50 parts acetic anhydride at 100° for 2 hours, then filtered off with suction at room temperature, washed with light petrol and dried. The yield is 71 parts disazo-tetracarboxylic di-anhydride of the formula The product has very good fastness to light, lacquer coating and migration. It is suitable for colouring acrylonitrile-butadiene-styrene copolymers and graft polymers.

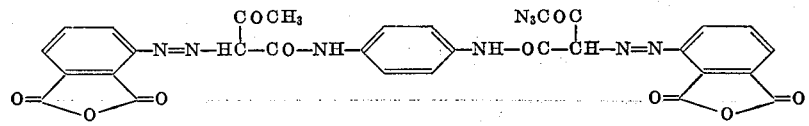

The pigment has good fastness to light and lacquer coating.

EXAMPLE 2

7.0 parts of the azo dyestuff obtained from 2 moles of diazotised 4-amino-phthalic anhydride and N,N'-bis-(acetoacetyl)-2,5-dichlorophenylene-diamine-1,4 are first heated in 250 parts chlorobenzene with 2 parts methylamine at 100° for 2 hours. 25 parts of glacial acetic acid are then added and the mixture is kept at 120° for a further 8 hours. After cooling to 40°, the product is filtered off with suction, washed with chlorobenzene at 40° and dried at 80° until the weight is constant. 7.2 parts of the azo dyestuff of the formula

EXAMPLE 4

8.75 parts of the disazo dyestuff obtained from 2 moles of diazotised 3-amino-phthalic anhydride and 1 mole N,N' - bis - [2'-hydroxy-naphthoyl-(3')]-4'''-diamino-diphenyl are heated in 500 parts chlorobenzene with 5 parts o-toluidine at 120° for 2 hours. 30 parts of glacial acetic acid are then added and the mixture is kept at 130° for a further 8 hours. The precipitated pigment dyestuff is filtered off with suction at 70–80°, washed with warm chlorobenzene until the runnings are clear

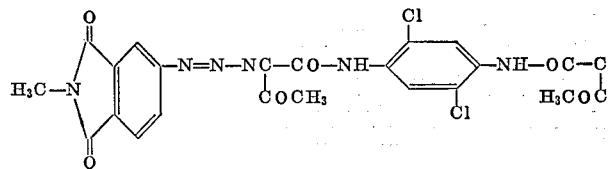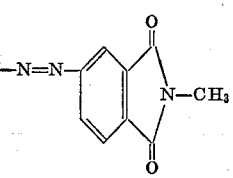

are obtained.

The pigment has very good fastness to migration and very good thermal stability.

EXAMPLE 3

44.5 parts 3-amino-phthalic acid are suspended in 500 parts of water, 200 parts of ice and 81 parts of concentrated hydrochloric acid are added and the mixture is diazotised at 0–5° with a solution of 17.2 parts sodium nitrite in 50 parts of water. The excess nitrite is destroyed by means of amidosulphonic acid.

55.0 parts N,N' - bis-[3'-hydroxy-naphthoyl-(2')-amino]-phenylene-1,4 are suspended in 200 parts ethanol, and dried in a vacuum at 80° until the weight is constant. 9.8 parts of a disazo pigment of the formula

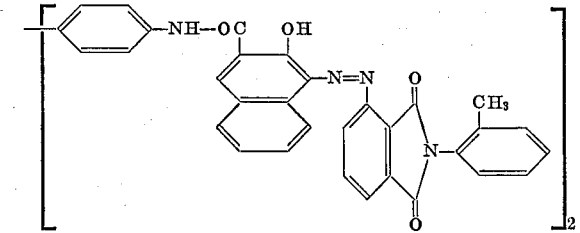

are obtained.

The pigment has very good fastness to light and lacquer coating.

EXAMPLE 5

50 parts of the azo dyestuff obtained from 2 moles of diazotised 4-amino-5-chloro-phthalic acid and 1 mole N,N' - bis - (acetoacetyl)-2,5-dichlorophenylene-diamine-1,4 are converted into the dianhydride by heating for 2 hours in 500 parts chlorobenzene with 50 parts acetic anhydride.

7.6 parts of this di-anhydride are heated in 500 parts o-dichlorobenzene with 5 parts 2,5-dichloro-aniline at 120° for 2 hours. 50 parts of glacial acetic acid are then added and the mixture is kept at 130–140° for a further 12 hours. The pigment is filtered off with suction at 70°, washed with o-dichlorobenzene and dried in a vacuum at 80° until the weight is constant. The yield is 10.1 parts of the pigment dyestuff of the formula

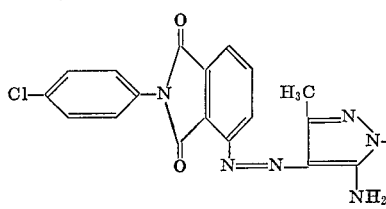

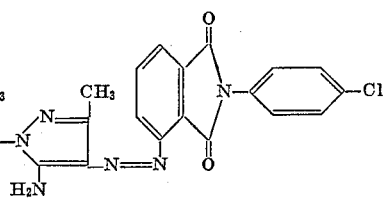

are heated in 500 parts chlorobenzene with 5 parts 4-chloroaniline at 120° for 3 hours. 50 parts of glacial acetic acid are then added and the mixture is kept at 130–140° for a further 7 hours. The precipitated pigment is isolated at 60°, washed with warm chlorobenzene and dried. 8.5 parts of the disazo pigment of the formula

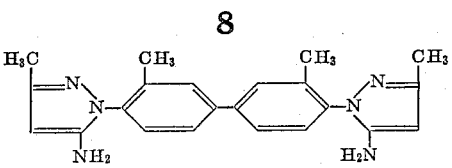

are obtained.

Valuable pigment dyestuffs are also obtained when the process is carried out as described in the above examples, but using, instead of the diazo components, bifunctional coupling components and monoamines there specified, the

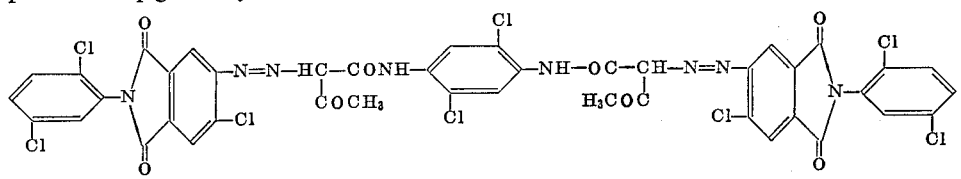

EXAMPLE 6

7.2 parts of the disazo dyestuff obtained from 2 moles of diazotised 3-amino-phthalic anhydride and 1 mole of the bifunctional coupling component diazo components, coupling components and monoamines assembled in the following table:

| Diazo component | Coupling component | Amine | Shade |
| --- | --- | --- | --- |
| 3-amino-phthalic acid | N,N'-bis-[3'-hydroxy-naphthoyl-(2')]-phenylene-diamine-1,4. | Methylamine | Red. |
| Do | do | Benzylamine | Red. |
| Do | do | o-Toluidine | Red. |
| Do | do | p-Chloro-aniline | Red. |
| Do | do | N-acetyl-p-phenylene-diamine | Red. |
| Do | N,N'-bis-[3'-hydroxy-naphthoyl-(2')]-2-chloro-phenylene-diamine-1,4. | Aniline | Red. |
| Do | do | 2-Chloro-aniline | Red. |
| Do | do | o-Toluidine | Red. |
| Do | do | 4-methoxy-aniline | Red. |
| Do | do | 2-amino-benzothiazole | Red. |
| Do | N,N'-bis-[3'-hydroxy-naphthoyl-(2')]-4'',4'''-diamino-diphenyl. | Methylamine | Red. |
| Do | do | Aniline | Red. |
| Do | do | 2-chloro-aniline | Red. |
| Do | do | 1-naphthylamine | Red. |
| Do | N,N'-bis-(acetoacetyl)-phenylene-diamine-1,4 | Methylamine | Yellow. |
| Do | do | Aniline | Do. |
| Do | do | p-toluidine | Do. |
| Do | do | 2,5-dichloro-aniline | Do. |
| Do | do | Cyclohexylamine | Do. |
| Do | N,N'-bis-(acetoacetyl)-2,5-dichloro-phenylene-diamine-1,4. | Methylamine | Greenish yellow. |
| Do | do | Aniline | Do. |
| Do | do | o-Toluidine | Do. |
| Do | do | 4-amino-biphenyl | Do. |
| Do | do | p-Toluidine | Do. |
| Do | [Phenylene-(4,4')]-bis-[3''-methyl-pyrazolon-(5'')-yl-(1'')]. | Methylamine | Reddish yellow. |
| Do | do | Aniline | Do. |
| Do | do | p-Toluidine | Orange. |
| 4-amino-phthalic acid | do | N-benzoyl-phenylene-diamine-1,4 | Do. |
| Do | N,N'-bis-(acetoacetyl)-phenylene-diamine-1,4 | Aniline | Yellow. |
| Do | do | Methylamine | Do. |
| Do | do | p-Toluidine | Do. |
| Do | N,N'-bis-(acetoacetyl)-2,5-dichloro-phenylene-diamine-1,4. | Aniline | Do. |
| Do | do | p-Toluidine | Do. |
| Do | do | N-acetyl-phenylene-diamine-1,4 | Do. |
| Do | N,N'-bis-[3'-hydroxy-naphthoyl-(2')]-phenylene-diamine-1,4. | Methylamine | Red. |
| Do | do | Aniline | Red. |
| Do | do | p-Toluidine | Red. |
| Do | do | p-Chloro-aniline | Red. |
| Do | N,N'-bis-[3'-hydroxy-naphthoyl-(2')]-4'',4'''-diamino-diphenyl. | 2-amino-propane | Red. |
| Do | do | 2-amino-pyridine | Red. |
| Do | do | 4-amino-benzoic acid ethyl ester | Red. |
| Do | do | p-Toluidine | Red. |

| Diazo component | Coupling component | Amine | Shade |
|---|---|---|---|
| 3-amino-6-chlorophthalic acid | N,N'-bis-[3'-hydroxy-naphthoyl-(2')]-phenyl-enediamine-1,4. | Aniline | Red. |
| Do | do | p-Toluidine | Red. |
| Do | do | 2-chloro-aniline | Red. |
| 4-amino-5-chloro-phthalic acid | do | p-Toluidine | Red. |
| 3-amino-6-methoxy-phthalic acid | N,N'-bis-[3'-hydroxy-naphthoyl-(2')]-2-chloro-phenylene-diamine-1,4. | Methylamine | Red. |
| Do | do | Aniline | Red. |
| Do | N,N'-bis-(acetoacetyl)-2,5-dichloro-phenylene-diamine-1,4. | 4-chloro-aniline | Yellow. |
| 3-amino-6-chloro-phthalic acid | do | p-Toluidine | Greenish yellow. |
| 4-amino-5-chloro-phthalic acid | do | Aniline | Do. |
| 4-amino-5,6-dichloro-phthalic acid | do | 2-chloro-aniline | Do. |
| 3-amino-6-chloro-phthalic acid | [Phenylene-(4,4')]-bis-[3'-methyl-pyrazolon-(5'')-yl-(1'')]. | Methylamine | Orange. |
| 4-amino-5-chloro-phthalic acid | do | Aniline | Do. |
| Do | [Phenylene-(4,4')]-bis-[3'-methyl-5''-amino-pyrazolyl-1'']. | o-Toluidine | Do. |
| Do | do | 2-chloro-aniline | Do. |
| Do | [Biphenylene-(4,4')]-bis-[3'-methyl-pryazolon-(5'')-yl-(1'')]. | Aniline | Do. |
| 3-amino-6-chloro-phthalic acid | do | Aniline | Do. |
| 3-amino-phthalic acid | N,N'-bis-(acetoacetyl)-2,5-dichloro-phenylene-diamine-1,4. | 4-chloro-aniline | Greenish yellow. |
| Do | do | 2,3-dimethyl-aniline | Do. |
| Do | do | 3-chloro-aniline | Do. |
| Do | do | m-Toluidine | Do. |
| Do | do | 2-methoxy-aniline | Do. |
| Do | do | 3-methoxy-aniline | Do. |
| Do | do | 3,5-dichloro-aniline | Do. |
| Do | do | 3-methyl-4-chloro-aniline | Do. |
| Do | do | 3,5-dimethyl-aniline | Do. |
| Do | do | 3,5-di-trifluoro-methyl-aniline | Do. |
| Do | do | N-benzoyl-phenylene-diamine-1,4 | Do. |
| Do | N,N'-bis-(acetoacetyl)-2-chloro-5-methyl-phenyl-enediamine-1,4. | Cyclohexylamine | Do. |
| Do | do | Methylamine | Do. |
| Do | do | Aniline | Do. |
| Do | do | o-Toluidine | Do. |
| Do | do | m-Toluidine | Do. |
| Do | N,N'-(acetoacetyl)-2,5-dimethyl-phenylene-diamine-1,4. | Cyclohexylamine | Yellow. |
| Do | do | m-Toluidine | Do. |
| Do | do | Aniline | Do. |
| 4-amino-5-methoxy-phthalic acid | N,N'-bis-[3'-hydroxy-naphthoyl-(2')]-phen-ylenediamine-1,4. | Cyclohexylamine | Red. |
| Do | do | Aniline | Red. |
| Do | do | Methylamine | Red. |
| Do | do | 4-chloro-aniline | Red. |
| Do | N,N'-bis-(acetoacetyl)-2,5-dichloro-phenylene-diamine-1,4. | Methylamine | Yellow. |
| Do | do | Aniline | Do. |
| Do | do | m-Toluidine | Do. |
| Do | do | Cyclohexylamine | Do. |
| Do | do | 4-chloro-aniline | Do. |
| Do | do | p-Toluidine | Do. |
| 5-amino-5-methyl-phthalic acid | do | Cyclohexylamine | Do. |
| Do | do | Aniline | Do. |
| Do | do | Methylamine | Do. |
| 4-amino-5-methyl-phthalic acid | N,N'-bis-(acetoacetyl)-2,5-dichloro-phenylene-diamine-1,4. | m-Toluidine | Do. |
| Do | N,N'-bis-[3'-hydroxy-naphthoyl-(2)]-phenylene-diamine-1,4. | Aniline | Red. |
| Do | do | 4-chloro-aniline | Red. |
| Do | do | Cyclohexylamine | Red. |
| 4-amino-5-chloro-phthalic acid | N,N'-bis-(acetoacetyl)-2,5-dichloro-phenylene-diamine-1,4. | Methylamine | Yellow. |
| Do | do | Cyclohexylamine | Do. |
| Do | do | m-Toluidine | Do. |

EXAMPLE 7

28 parts of the disazo dyestuff obtained from 2 moles of diazotised 3-amino-phthalic acid anhydride and 1 mole of N,N' - bis - (acetoacetyl) - 2,5 - dichlorophenylene-diamine-1,4 and 16 parts of cyclohexylamine are heated for 4 hours at 130–140° in a mixture of 220 parts of o-dichloro-benzene and 30 parts of glacial acetic acid. The pigment is filtered off with suction at 60–70° washed with warm o-dichloro-benzene until the runnings are clear and dried in a vacuum at 80° until the weight is constant. 25.7 parts of a greenish yellow disazo pigment of the formula

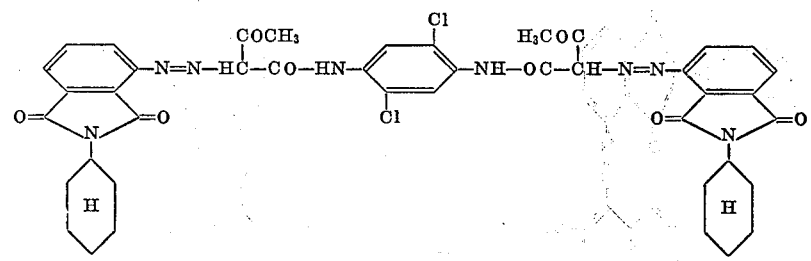

are obtained.
The pigment has very good fastness properties.

We claim:
1. Azo dyestuff free from sulphonic acid groups and corresponding to the formula

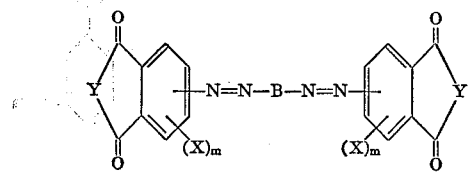

wherein B is the residue of N,N'-arylene-bis-[2'-hydroxy-naphthoyl - (3')] - amide, N,N' - arylene - bis - aceto-acetyl - amide, arylene - bis - [3 - methyl - pyrazolone- (5) - yl - (1)], arylene - bis-[3 - carbomethoxy - pyrazolone - (5) - yl - (1)], or arylene - bis - [3 - methyl - 5-amino-pyrazol-yl-(1)] of the formula

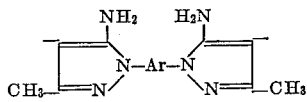

wherein the terms arylene and —Ar— denote phenylene, diphenylene, diphenylene methane, diphenylene ether, diphenylene sulphone, benzophenone, stilbene, diphenylene urea, naphthalene, diphenylene oxide, chlorinated phenylene, chlorinated biphenylene, methyl phenylene, methyl biphenylene, or methoxy diphenylene; Y is oxygen or >N—R, wherein R is hydrogen, hydroxyl, methyl, ethyl, propyl, phenyl, carbonamidophenyl, acetylamino phenyl, phenyl carbonylamino phenyl, cyclohexyl, benzothiazole, pyridine, naphthalene, chloro carbonamidophenyl, biphenyl or phenyl substituted by methyl, methoxy, nitro, chloro, carboethoxy or trifluoromethyl; X is lower alkyl, lower alkoxy, halo, nitro, methyl sulphonyl, phenylsulphonyl, $CF_3$ carbomethoxy or carboethoxy; and $m$ is 0 to 3.

2. The azo dyestuff of the formula

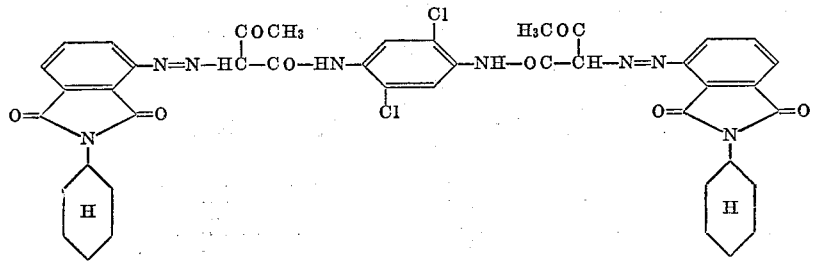

3. The azo dyestuff of the formula

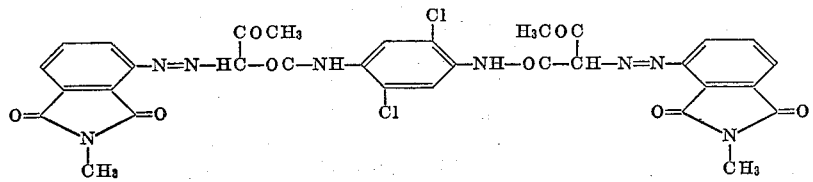

4. The azo dyestuff of the formula

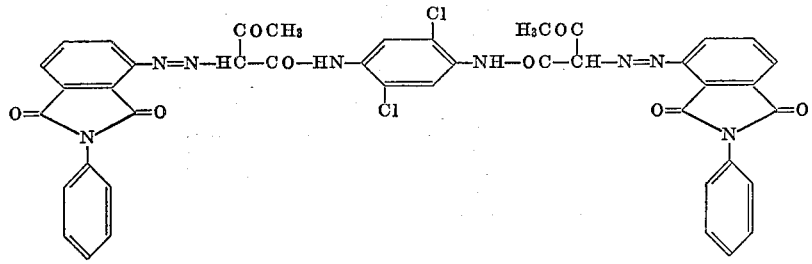

5. The azo dyestuff of the formula

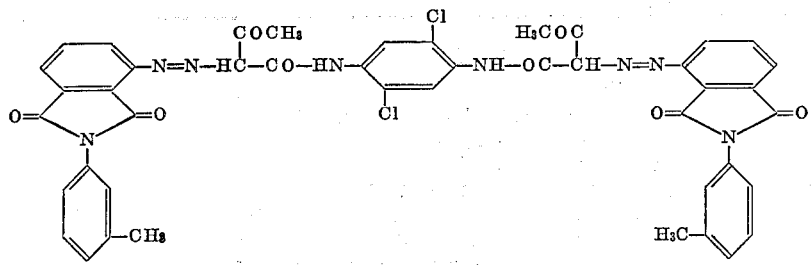

6. The azo dyestuff of the formula

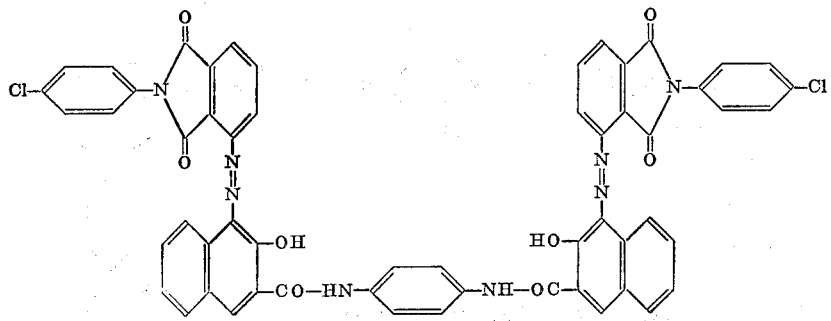

7.
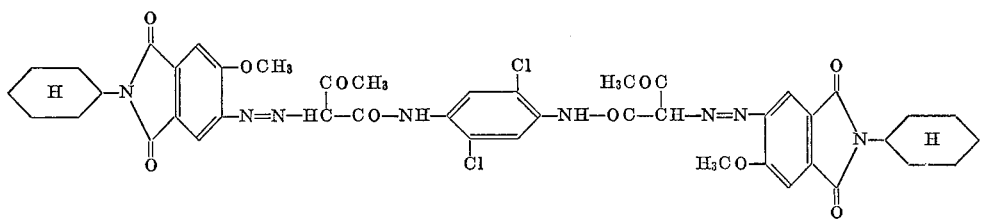
8.
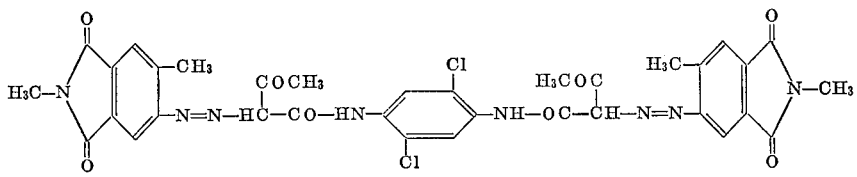
References Cited
UNITED STATES PATENTS
| | | | |
|---|---|---|---|
| 3,182,073 | 5/1965 | Lonerini | 260—152 XR |
| 3,356,672 | 12/1967 | Schefczik | 260—152 |
| 3,402,166 | 9/1968 | Heckl et al. | 260—152 |
| 3,415,806 | 12/1968 | Pfister et al. | 260—152 XR |
FOREIGN PATENTS
501,855  3/1939  Great Britain.
FLOYD D. HIGEL, Primary Examiner
U.S. Cl. X.R.
8—4, 7, 71; 106—288; 117—138.8, 152; 260—37, 41, 41.5, 160, 176, 187, 310, 346.3, 518, 519, 560, 562

Page 1 of 2 pages

UNITED STATES PATENT OFFICE
CERTIFICATE OF CORRECTION

Patent No. 3,526,618                         Dated September 1, 1970

Inventor(s) Walter Horstmann, et al.

It is certified that error appears in the above-identified patent and that said Letters Patent are hereby corrected as shown below:

| Column | Line | Error |
|--------|------|-------|
| 2 | 30-35 | " " |

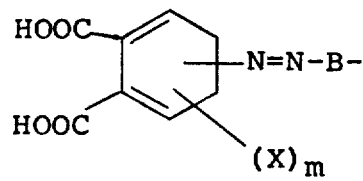

should read ---

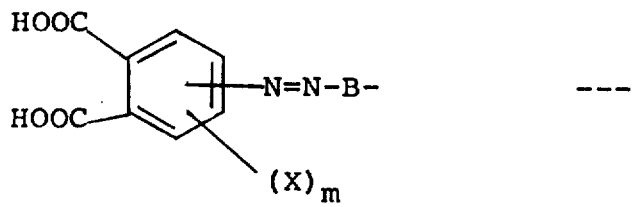

---

UNITED STATES PATENT OFFICE
CERTIFICATE OF CORRECTION

Page 2

Patent No. 3,526,618  Dated September 1, 1970

Inventor(s) Walter Horstmann, et al.

It is certified that error appears in the above-identified patent and that said Letters Patent are hereby corrected as shown below:

| Column | Line | Error |
|---|---|---|
| 5-6 | 37-38 | " $N_3COC$ "<br>                      \|<br>    $-NH-OC-CH-N=N-$<br><br>should read --- $H_3COC$ ---<br>                             \|<br>                    $-NH-OC-CH-N=N-$ |
| 5 | 55-65 | "$-N=N-NC-$" should read --- $-N=N-HC-$ --- |
| 6 | Example 4<br>47 | "$]-4"'-$" should read --- $]-4",4"'$ --- |
| 12 | Claim 3<br>formula | "$-HC-OC-$" should read --- $-HC-CO-$ --- |

SIGNED AND
SEALED
DEC 15 1970

(SEAL)
Attest:

Edward M. Fletcher, Jr.

Attesting Officer

WILLIAM E. SCHUYLER, JR.
Commissioner of Patents